United States Patent Office 3,239,483
Patented Mar. 8, 1966

3,239,483
STABILIZATION OF POLYISOBUTYLENE POLYMERS WITH SULFUR AND BENZOTRIAZOLES
John J. Higgins, Roselle, N.J., assignor to Esso Research and Engineering Company, a corporation of Delaware
No Drawing. Filed Aug. 8, 1960, Ser. No. 47,913
1 Claim. (Cl. 260—45.8)

The present invention is concerned with the stabilization of relative saturated polymers containing a major proportion of $C_4$ to $C_8$ isoolefins against attack from ultraviolet rays. More specifically, it relates to the stabilization of polyisobutylene polymers from degradation due to attack by ultraviolet light.

Homopolymers of $C_4$ to $C_8$ isoolefins, e.g., polyisobutylene, polyisoamylene, etc. have found increasing use in industry, e.g., adhesives, tire components, electrical insulation, etc. For example, polyisobutylene polymers range from soft gums to tough elastic solids depending upon their viscosity average molecular weight which may range from 30,000 to over 10,000,000 (Staudinger molecular weights of 8,000 to 350,000). They have a nearly saturated structure. Such polymers are produced by a low temperature Friedel-Crafts reaction in a low freezing solvent such as methyl or ethyl chloride or carbon disulfide. Temperatures applied may range from —20° C. to —150° C. or lower. A detailed description of polyisobutylene polymers and their preparation may be had by referring to U.S. Patents 2,248,071 and 2,856,392.

It has been found that such polymers tend to become tacky, lose strength and molecular weight, and degrade fairly rapidly upon exposure to the ultraviolet rays of sunlight. Obviously such behavior detracts from the usefulness of these polymers.

It has now been found that polymers of $C_4$ to $C_8$ isoolefins, particularly polyisobutylene, may have their stability towards ultraviolet light greatly enhanced by incorporating therein a minor proportion of sulfur, e.g., 0.05 to 10 weight percent based on polymer. It is highly preferred to incorporate a minor proportion, e.g. 0.05 to 10, preferably 0.1 to 5 weight percent, based on polymer of a combination of both sulfur and a hydroxy phenyl benzotriazole derivative. The combination of these two materials in the polymer offers a synergistic effect in that the combination of both materials imparts a much higher degree of resistance to ultraviolet light than is secured by employing equivalent amounts of either material alone. In general, the weight ratio of sulfur to hydroxy phenyl benzotriazole derivative will vary from about 5 to 0.02. Approximately equal concentrations are, however, preferred.

The hydroxy phenyl benzotriazole derivative employed in the practice of the present invention may be denoted by the following generic structural formula:

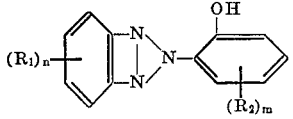

wherein $R_1$ and $R_2$ are hydrocarbon radicals selected from the group consisting of $C_1$ to $C_{20}$ alkyls and $C_1$ to $C_{20}$ alkoxy groups, hydrogen, halogen, hydroxy, carboxy, amino, nitrogen or aryl groups, and $n$ and $m$ are integers in the range of 1 to 4, the sum of $n$ and $m$ being greater than 2. Particularly desired are compounds wherein at least one R group is methyl or hydrogen.

Examples thereof are:

2-(2-hydroxy phenyl)-benzotriazole
2-(2-hydroxy, 3-methyl phenyl)-benzotriazole
2-(5-amino, 2-hydroxy phenyl)-benzotriazole
2-(2,4-dihydroxy phenyl)-benzotriazole
2-(3,5-dibromo, 2,4-dihydroxy phenyl)-benzotriazole
2-(3,5-dinitro, 2,4-dihydroxy phenyl)-benzotriazole
2-(2,3,4-trihydroxy, 6-carboxy phenyl)-benzotriazole
5-amino-2-(2-hydroxy phenyl)-benzotriazole
2-(2-hydroxy naphthyl)-benzotriazole It is noted that it has previously been suggested to employ sulfur as a heat stabilizer for polyisobutylene. However, there are many applications for such polymers wherein heat stabilization is of little or no importance, whereas, ultraviolet stabilization is a prime concern, e.g., in roof coatings and in blends with other polyolefins. These blends usually in film form are used in heavy duty bags, protective coverings, outdoor furniture coverings, etc. Thus, one would not be led to employ sulfur in such compositions. Moreover, the preferred embodiment of employing a combination of sulfur and a hydroxy phenyl benzotriazole derivative and obtaining a synergistic result thereby is clearly distinguishable over the use of sulfur for heat stabilization.

Further, it is to be noted that homopolymers such as polyisobutylene are not vulcanized by sulfur, and thus the conventional use of sulfur as a curative does not anticipate the present invention.

In addition to the ultraviolet stabilizers of the present invention, various other conventional polymer additives such as process oils, pigments, fillers, low temperature plasticizer resins, waxes, etc. may be incorporated in the present polymer compositions to serve as conventional modifying agents. The polymer compositions of the present invention may be blended with other polymers such as polyethylene, polypropylene, copolymers of various olefins and copolymers such as butadiene-styrene, isobutylene-isoprene, etc. for use in packaging, protective coatings, and proofed goods.

The various aspects and modifications of the present invention will be made more clearly apparent by reference to the following examples and accompanying description.

EXAMPLE 1

A polyisobutylene polymer having a Staudinger molecular weight of about 89,000 was prepared at about —95 to —100° C. in the presence of a solution of aluminum chloride in ethyl chloride. Three samples of the resulting polymer were then compared as to ultraviolet light resistance.

Sample 1 was not subjected to exposure to ultraviolet light. Sample 2, containing no stabilizers, and sample 3, containing sulfur as indicated in Table I, were exposed to ultraviolet light. Sulfur was blended into sample 3 on a conventional rubber mill. Samples 1, 2 and 3 were sheeted off into strips between 20 and 50 mils in thickness. The strips were then exposed in an Atlas Fadeometer for 60 hours at a temperature of 120–130° F., procedure and apparatus as described in ASTM D–750–55T (carbon arc light source).

After exposure to the ultraviolet light, the samples were analyzed for molecular weight using the Staudinger method. The percent molecular weight retained as reported in Table I is a comparison of the molecular weight retention of samples 2 and 3 as compared to non-exposed sample 1.

Table I

| Stabilizer | Samples | | |
|---|---|---|---|
| | 1 | 2 | 3 |
| Sulfur (parts by wt. per 100 parts of polymer) | 0 | 0 | 1 |
| Percent Molecular Weight Retained After Exposure | Not exposed | 40.2 | 77.3 |

As shown by the above data, a minor proportion of sulfur greatly increases the ability of polyisobutylene to resist ultraviolet degradation. In a similar test to that described, the incorporation of 0.2 weight percent sulfur in a polyisobutylene polymer having an initial Staudinger molecular weight of about 82,000 gave a 78.6% molecular weight retention after exposure in an Atlas Fadeometer under the conditions described in Example 1. The non-stabilized polymer gave only 26.7% molecular weight retention when similarly exposed.

EXAMPLE 2

The same procedure described in Example 1 was employed with the same polyisobutylene polymer (Staudinger molecular weight of 89,000) except that a combination of sulfur and a hydroxy phenyl benzotriazole derivative was evaluated as an agent for ultraviolet light stabilization.

In sample 7, only the hydroxy phenyl benzotriazole derivative was incorporated into the polymer, whereas, in sample 6 both sulfur and the hydroxy phenyl benzotriazole compound were added to the polyisobutylene. Sample 4 contained neither stabilizer. Sample 5 contained only sulfur as a stabilizer and is the same as sample 3 of Example 1.

The stabilizers were blended into the polyisobutylene on a conventional rubber mill. In each sample, the polymer was then sheeted off at between 20 to 50 mils in thickness and strips from these sheets were exposed in an Atlas Fadeometer for 60 hours at a temperature of 120–130° F. as in Example 1. After exposure to the ultraviolet light, the samples were analyzed for molceular weight using the Staudinger method and their molecular weight compared to that (89,000) of the unexposed polymer. It is to be noted that samples of Examples 1 and 2 were all exposed to the same conditions at the same time.

Table II

| Stabilizer | Samples | | | |
|---|---|---|---|---|
| | 4 | 5 | 6 | 7 |
| Sulfur, phr | 0.0 | 1.0 | 0.5 | 0.0 |
| Hydroxy Phenyl Benzotriazole [1] derivative, phr | 0.0 | 0.0 | 0.5 | 1.0 |
| Percent Molecular Weight Retained After Exposure | 40.2 | 77.3 | 94.4 | 56.2 |

[1] Sold under the trade name of Tinuvin P by Geigy Chemical Company and having the structure 2-(2'-hydroxy-5'-methylphenyl)benzotriazole. It is an off-white crystalline powder having a melting point of 131–2° C. A solution of 25 mg. in 100 ml. of chloroform in a one centimeter Beckman cell transmits practically no radiation at 380 mu yet transmits 100% at 410 mu. Tinuvin P exhibits the following solubilities at 25° C.: Water—0.0001 gm./100 ml., Ethanol—0.5, Acetone—5.0, Styrene—7.0, and Hexane—1.1.

As shown by the above data, although individually both sulfur and hydroxy phenyl benzotriazole afford protection against ultraviolet rays, the combination of both materials (sample 6) gives a completely unexpected high degree of resistance to ultraviolet light breakdown and is considerably more effective than the use of equivalent amounts of either sulfur or hydroxy phenyl benzotriazole derivatives alone.

Various modifications to the present invention will suggest themselves to those skilled in the art, e.g. the use of additional modifying agents. Having described the present invention, that which is sought to be protected is set forth in the following claim.

What is claimed is:

A composition comprising polyisobutylene and between about 0.1 and about 5.0 wt. percent, based on polymer, of a combination of sulfur and 2-(2'-hydroxy-5'-methylphenyl benzotriazole), wherein the weight ratio of sulfur to said benzotriazole compound is about 1:1.

References Cited by the Examiner

UNITED STATES PATENTS

| 2,582,510 | 1/1952 | Stiratelli | 260—45.8 |
| 2,837,528 | 6/1958 | Pugin et al. | 260—308 |
| 3,004,896 | 10/1961 | Heller et al. | 260—45.8 |
| 3,018,269 | 1/1962 | Bruno | 260—45.8 |
| 3,072,585 | 1/1963 | Milionis et al. | 260—45.95 |
| 3,111,502 | 11/1963 | Coran. | |

FOREIGN PATENTS 716,338   10/1954   Great Britain.

LEON J. BERCOVITZ, *Primary Examiner.*

A. RUNNINS, MILTON STERMAN, JOSEPH R. LIBERMAN, *Examiners.*